United States Patent [19]

Hanna, Sr.

[11] 4,152,264
[45] May 1, 1979

[54] LAKE PUMP SUCTION MECHANISM

[76] Inventor: John W. Hanna, Sr., P. O. Box 696, Gallatin, Tenn. 37066

[21] Appl. No.: 850,257

[22] Filed: Dec. 23, 1977

[51] Int. Cl.² .............................................. B01D 35/02
[52] U.S. Cl. ..................... 210/170; 210/250; 210/306; 210/448; 210/460; 210/416 DW
[58] Field of Search ............... 210/170, 429, 430, 448, 210/449, 464, 416 DW, 250, 460, 305, 306; 166/235, 316; 137/236

[56] References Cited

U.S. PATENT DOCUMENTS

| | | | |
|---|---|---|---|
| 2,913,995 | 11/1959 | Brenner | 210/430 X |
| 3,291,313 | 12/1966 | Davis | 210/250 |
| 3,722,686 | 3/1973 | Arnett et al. | 210/170 |

FOREIGN PATENT DOCUMENTS 108930  2/1924  Switzerland ............................ 210/250

Primary Examiner—John Adee

[57] ABSTRACT

A suction mechanism submerged underwater in a lake, the suction mechanism being designed to eliminate sand and mud from entering a foot valve connected to hoses for pumping water out of lake for use; the suction mechanism including the foot valve being at the upper end of a vertical suction pipe, the foot valve being covered by a protective dome, a horizontal anchor stand supporting the suction pipe vertically and the lines leading from the lake including a suction pipe and a pressure pipe.

3 Claims, 3 Drawing Figures

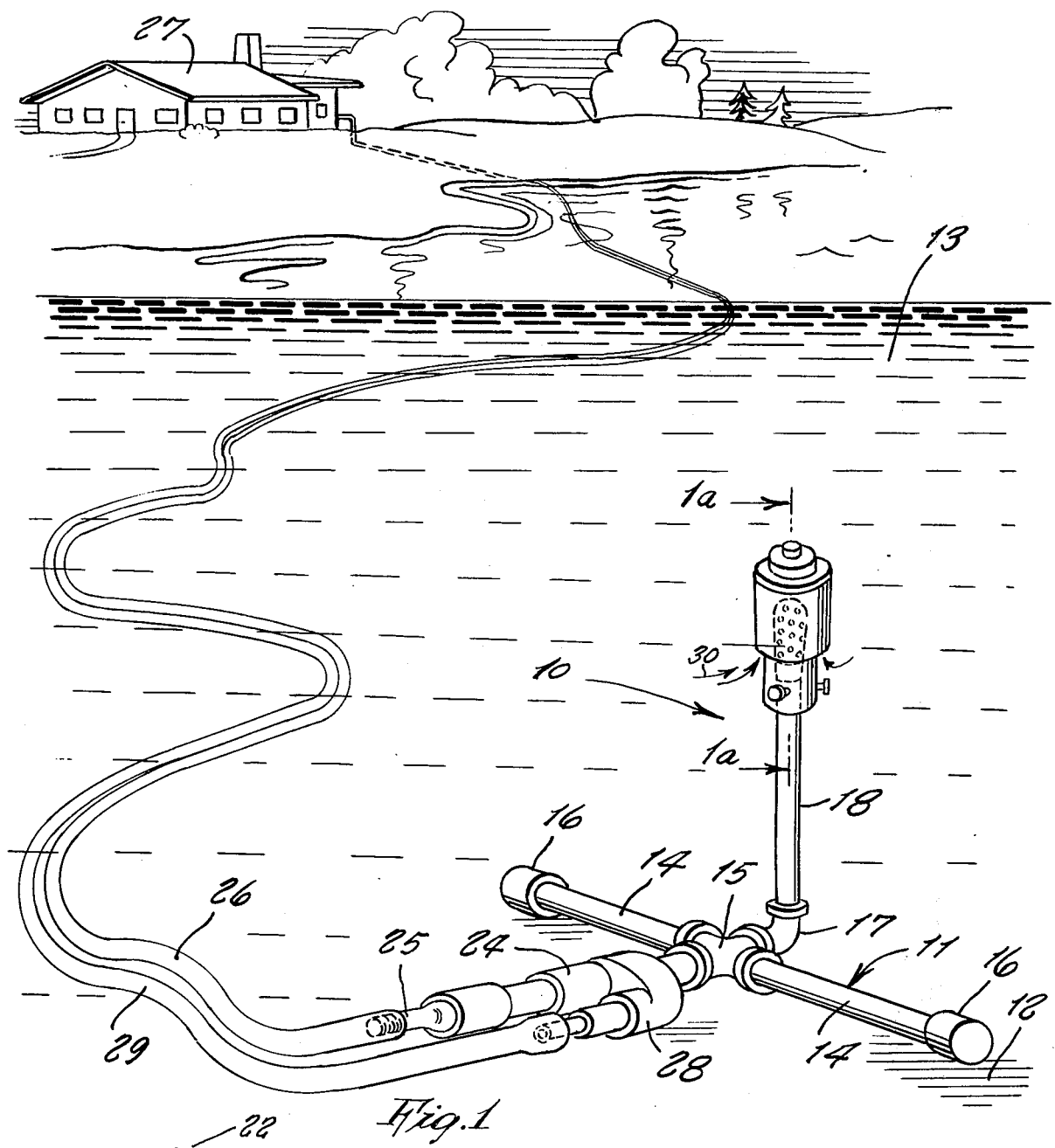
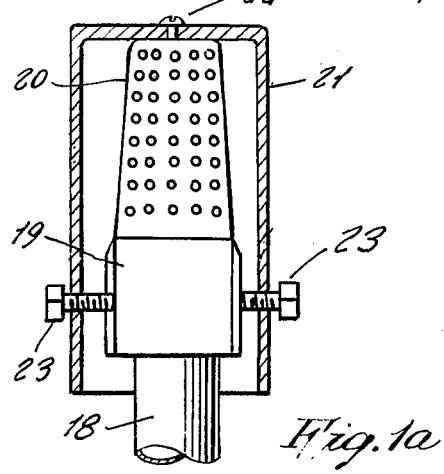
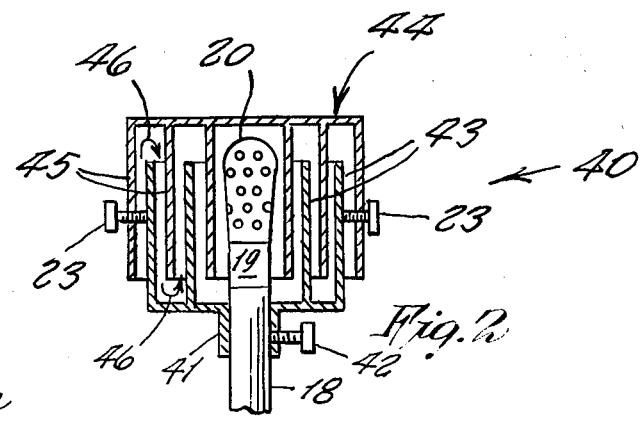
Fig. 1
Fig. 1a
Fig. 2

LAKE PUMP SUCTION MECHANISM

This invention relates generally to water pumping equipment. More specifically, it relates to a suction mechanism for a pump.

A principal object of the present invention is to provide a suction mechanism designed to be used with a lake pump, carrying either a single or double suction pipe, the suction mechanism being designed to eliminate sand and mud from entering the device.

Another object is to provide a lake pump suction mechanism, which prevents sand and mud from entering a foot valve of the device, so that it cannot travel in the line to a pump, which would cause a seal to burn out, and thus destroy the pump.

Yet a further object of the present invention is to provide a lake pump suction mechanism, in which the foot valve is supported a substantial distance above a bottom of the lake, so as to be out of the vicinity of any sand, mud or other debris from entering the system.

Other objects are to provide a lake pump suction mechanism, which is simple in design, inexpensive to manufacture, rugged in construction, easy to use and efficient in operation.

These, and other objects, will be readily evident, upon a study of the following specification, and the accompanying drawing wherein:

FIG. 1 is a perspective view of the present invention, shown installed within a lake for pumping water to a house;

FIG. 1a is an enlarged cross-sectional view, taken on line 1a—1a of FIG. 1, and illustrating a generally similiar construction, and FIG. 2 is a cross-sectional view, generally similiar to FIG. 1a, and which incorporates a modified design thereof, by including a labyrinth construction so as to positively stop any debris or other foreign matter from getting to the foot valve.

Referring now to the drawing in greater detail, and more particularly, to FIGS. 1 and 1a thereof at this time, the reference numeral 10 represents a lake pump suction mechanism, according to the present invention, wherein there is an anchor stand 11, for resting upon a bottom 12 of a lake 13. The stand includes horizontally extending pipes 14, connected to opposite ends of a cross-fitting 15, the outer ends of the pipes 14 being fitted with end caps 16. An elbow 17, also attached to the cross-fitting 15, supports a vertically upstanding suction pipe 18, which, at its upper end, is fitted with a foot valve 19. A perforated filter screen 20 is mounted upon the foot valve, and serves for water to pass therethrough, before entering the foot valve.

A dome-shaped cover 21, made of plastic is fitted over the top of the screen and foot valve, the cover extending downward below the foot valve, and being spaced therefrom, so that water can move upwardly under the dome-shaped cover, and up into the screen 20, so as to enter the foot valve. A single anchor screw 22, through a top of the cover, is secured to the upper end of the screen, and a plurality of four anchor screws 23, located equidistant apart, extend around the side of the cover, and lock against the side of the foot valve, in order to rigidly secure the cover in place.

A fitting 24, secured to the cross fitting 15, includes an outlet 25, to which one end of a rigid or flexible suction pipe 26 is connected, the pipe 26 resting on the bottom of the lake, and leading to a shore thereof, and up to a house 27, as illustrated in FIG. 1, so as to bring a fresh water supply thereto. An ejector 28, on the fitting 24, is connected to one end of either a flexible or rigid pressure pipe 29, which extends alongside the suction pipe 26 to the house 27.

This comprises a high level pumping operation from 25 feet or more above the lake, and by removing the ejector, and using one hose to make a low level operation 25 feet below a lake or less. This assembly can be used on double or single pipe pump by removing the ejector, and adding a single pipe adapter. Also, the mechanism can be driven by utility water pressure, to bring water out of the lake when no pump is used.

The system stays full of water, which gives added weight, so as to hold everything down securely on the bottom of the lake.

In operative use, water enters under the down-shaped cover, as shown by the arrows 30 in FIG. 1. The entering water moves up through the screen 20, and then down into the foot valve 19. The foot valve is positioned upside down, and works perfectly. Atmospheric pressure is at 14 and seven-tenths pounds pressure per square inch at sea level.

Referring now to FIG. 2 of the drawing, there is shown a modified design of lake pump suction mechanism 40, which is generally a same as above described suction mechanism 10, except that it additionally includes a labyrinth construction, so as to positively insure against any foreign matter getting to the screen and foot valve. This labyrinth construction includes a fitting 41, secured by a set screw 42 to the vertical suction pipe 18, the fitting 41 including a plurality of concentric, circular upwardly extending walls 43. In this design, the cover 44 is likewise designed having a plurality of concentric, circular walls 45 extending downward, and which interfit between the walls 43 of the fitting 41, so that water entering the device must move up and down repeatedly several times, before it reaches the screen 20 of the device. Thus, all debris is resisted from entering. In the figure, the arrows 46 show the course of the entering water, as it moves up and down between the walls of the fitting and the cover.

While various changes may be made in the detail construction, it is understood that such changes will be within the spirit and scope of the present invention, as is defined by the appended claims.

What I now claim is:

1. A lake pump suction mechanism, comprising, in combination, an anchor stand placeable upon a bottom of a lake, said stand including an upward, vertical suction pipe, an upper end of said suction pipe supporting a protected water intake, and said stand being secured to a flexible suction pipe and a flexible pressure pipe resting upon a bottom of said lake and extending to a shore from where said flexible suction pipe and pressure pipe are attachable to a house or the like, being supplied by water from said lake; said protected water intake including an inverted foot valve with a perforated screen thereupon and a dome-shaped cover secured thereupon that extends downwardly a substantially greater distance than a lower end of said screen, so that said screen is confined within an upper end of said dome-shaped cover.

2. The combination as set forth in claim 1, wherein said anchor stand includes additionally a cross fitting from opposite ends of which there extend a pair of straight horizontal pipes, the outer ends of said pipes being fitted with an end cap, said vertical suction pipe being connected to an elbow attached to said cross fitting.

3. The combination as set forth in claim 2, wherein said protected water intake includes a labyrinth construction.

* * * * *